United States Patent

Imamura et al.

Patent Number: 5,434,681
Date of Patent: Jul. 18, 1995

[54] IMAGE SENSOR AND OPTICAL CHARACTER READER

[75] Inventors: Masaya Imamura; Kensuke Sawase, both of Kyoto, Japan

[73] Assignee: Rohm Co., Ltd., Tokyo, Japan

[21] Appl. No.: 53,164

[22] Filed: Apr. 27, 1993

[30] Foreign Application Priority Data

May 27, 1992 [JP] Japan ................... 4-134597

[51] Int. Cl.6 ........................................... H04N 1/40
[52] U.S. Cl. .................... 358/471; 358/496; 250/208.1
[58] Field of Search ............... 358/471, 473, 498, 400, 358/401, 474, 475, 487, 496; 250/208.1, 39; 257/433, 81, 82

[56] References Cited

U.S. PATENT DOCUMENTS

| 4,682,042 | 7/1987 | Igarashi ............... 250/208.1 |
| 4,733,098 | 3/1988 | Seito et al. ............ 257/433 |
| 4,875,579 | 10/1989 | Kubota et al. ......... 358/471 |
| 5,038,027 | 8/1991 | Ioka .................... 250/208.1 |
| 5,142,137 | 8/1992 | Kushino et al. ....... 250/208.1 |
| 5,254,847 | 10/1993 | Hata et al. ............ 250/208.1 |

FOREIGN PATENT DOCUMENTS

| 0239955A2 | 3/1987 | Japan . |
| 0239955A3 | 3/1987 | Japan . |
| 0402860A3 | 6/1990 | Japan . |
| 0402860A2 | 6/1990 | Japan . |
| 0465768A2 | 3/1991 | Japan . |
| 0465768A3 | 3/1991 | Japan . |
| 0457623A2 | 5/1991 | Japan . |
| 0457623A3 | 5/1991 | Japan . |

Primary Examiner—Edward L. Coles, Sr.
Assistant Examiner—Fan Lee
Attorney, Agent, or Firm—Wolf, Greenfield & Sacks

[57] ABSTRACT

A small-sized image sensor which does not exert the deleterious influence of soldering, especially, on the light receiving device when attaching a substrate for a light emitting device. A glass cover (11) is attached to the upper portion of a frame (10), and a substrate of a light projecting portion having a light emitting device (12) is fixed to the frame (10) in such a manner as to be inclined toward the glass cover (11). A rod lens array (14) for converging the light reflected from a copy on the glass cover (11) is fixed to the frame (10) in such a manner as to be perpendicular to the glass cover (11). A sensor substrate (16) having a light receiving device (15) is disposed directly under the rod lens array (14), and a hybrid substrate (21) with an electronic part (20) mounted thereon is disposed in a space within the frame (10). The substrates (16) and (21) are connected by a lead frame (22) soldered to the bottom surface of the sensor substrate (16). The lead frame also supports the substrate (21).

19 Claims, 7 Drawing Sheets

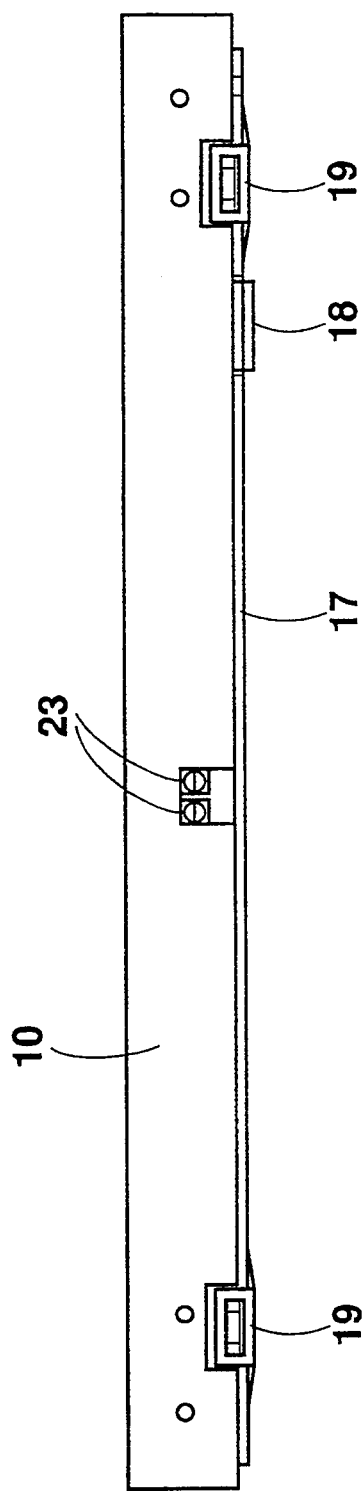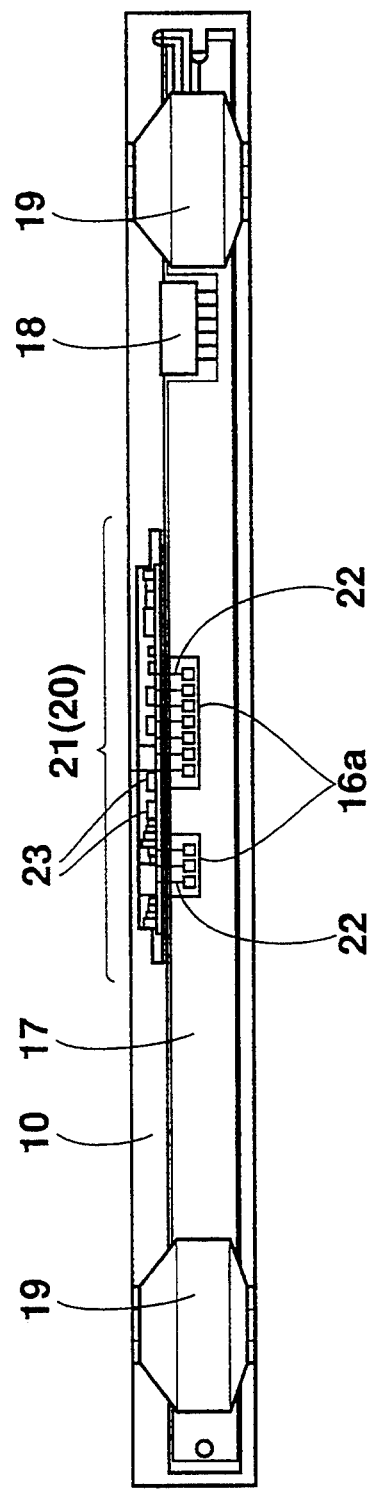
Fig. 3(a)
Fig. 3(b)

IMAGE SENSOR AND OPTICAL CHARACTER READER

BACKGROUND OF THE INVENTION

1. Field of the Invention

The present invention relates to an image sensor incorporated into an electronic machine such as a facsimile machine, a printer, a copying machine or an optical character reader.

2. Description of the Related Art

An example of a conventional contact type (compact contact type) image sensor is shown in a side elevational view in FIG. 5. In this image sensor 160, a transparent cover (glass cover) 31 is attached to the upper portion of a frame 30, and a substrate 33 of a light projecting portion (a light emitting portion) having a light emitting device 32 is fixed to the frame 30 in such a manner as to be inclined toward the surface of the glass cover 31. A rod lens array (optical system) 34 for converging the light reflected from a copy (not shown) as the object being photographed is fixed to the frame 30 perpendicularly relative to the surface of the glass cover 31. A sensor substrate (substrate of a light receiving portion) 36 having a light receiving device 35 for receiving the light from the rod lens array 34 is disposed directly under the rod lens array 34. A hybrid substrate (substrate of a signal processing portion) 41 carrying an electronic part 40 for driving the light emitting device 32 and the light receiving device 35 and processing an image information signal is soldered to the upper surface of the sensor substrate 36.

Another example of a conventional contact type image sensor is shown in a side elevational view in FIG. 6. This image sensor 260 has fundamentally the same structure as the image sensor 160 shown in FIG. 5. A glass cover 51 is attached to the upper portion of a frame 50, and a substrate 53 of a light projecting portion having a light emitting device 52, a rod lens array 54 and a sensor substrate 56 having a light receiving device 55 are disposed in the frame 50. In this example, the substrate 53 of the light projecting portion is fixed to the frame 50 through an elastic piece 57. A hybrid substrate 11 carrying an electronic part 73 for processing a signal is electrically connected to the sensor substrate 56 by a lead frame which is soldered to the bottom surface of the sensor substrate 56.

In such an image sensor 160 (260), the light emitted from the light emitting device 32 (52) enters obliquely to the glass cover 31 (51) and it is projected onto the copy on the glass cover 31 (51). The light reflected from the copy perpendicularly relative to the glass cover 31 (51) is converged on the rod lens array 34 (54), and received and converted into an electric signal by the light receiving device 35 (55).

In the image sensor 160 shown in FIG. 5, however, since the hybrid substrate 41 is soldered to the upper surface of the sensor substrate 36, it is often the case that flux or the like scatters on the light receiving device 35 during soldering and exerts deleterious influence on the light receiving device 35, which leads to the deterioration of the image quality. On the other hand, in the image sensor 260 shown in FIG. 6, although the light receiving device 55 is free from the deleterious influence of soldering, since the hybrid substrate 71 is situated under the sensor substrate 56, the substrates 56 and 71 together attain a great size and the height of the image sensor increases by the height of the hybrid substrate 71.

SUMMARY OF THE INVENTION

Accordingly, it is an object of the present invention to eliminate the above-described problems in the related art and to provide a small-sized image sensor which does not exert deleterious influence, especially, on the light receiving device at the time of attachment of a substrate for a light emitting device or a light receiving device which processes a signal.

To achieve this aim, in one aspect of the present invention there is provided an image sensor comprising:

(a) a transparent cover with which an object being photographed is brought into contact;

(b) a light emitting portion which is disposed in such a manner as to be inclined toward the transparent cover and which projects light onto the object;

(c) an optical system which is disposed perpendicularly relative to the transparent cover and which converges the light reflected from the object;

(d) a light receiving portion provided under the optical system so as to receive the light reflected from the optical system, (e) a substrate of a signal processing portion carrying an electronic part for processing an image information signal; and (f) a frame having an opening portion provided at the upper end thereof so as to receive the transparent cover, a first space provided directly under the opening portion so as to accommodate the light emitting portion, the optical system and the light receiving portion, and a second space provided separately from the first space so as to accommodate the substrate of the signal processing portion.

In another aspect of the the present invention, there is provided an optical character reader comprising:

(a) a feed-in tray for stocking a stack of objects being photographed;

(b) a feed roller for drawing and carrying the object at the top of the stack from the feed-in tray in the processing direction;

(c) an image sensor for reading the characters of the object carried by the feed roller as image information signals;

the image sensor including:

(i) a transparent cover with which the object is brought into contact;

(ii) a light emitting portion which is disposed in such a manner as to be inclined toward the transparent cover and which projects light onto the object;

(iii) an optical system which is disposed perpendicularly relative to the transparent cover and which converges the light reflected from the object;

(iv) a light receiving portion provided under the optical system so as to receive the light reflected from the optical system, (v) a substrate of a signal processing portion carrying an electronic part for processing an image information signal; and (vi) a frame having an opening portion provided at the upper end thereof so as to receive the transparent cover, a first space provided directly under the opening portion so as to accommodate the light emitting portion, the optical system and the light receiving portion, and a second space provided separately from the first space so as to accommodate the substrate of the signal processing portion;

(d) recording paper for transferring the object thereonto;

(e) a recording paper supplying portion including a platen roller for feeding the recording paper; and (f) a thermal transfer printing portion for printing the image read by the image sensor on the recording paper.

(3) In an image sensor and an optical character reader provided in still another aspect of the present invention, the second space of the frame is provided at the back of the inner wall of the first space on which the light emitting portion is disposed. In addition, the substrate carrying the light emitting portion on the upper surface thereof and the substrate of the signal processing portion are electrically connected to each other by a lead frame, and the lead frame is soldered to predetermined soldering patterns formed on the bottom surface of the substrate of the light receiving portion and the substrate of the signal processing portion.

According to these image sensors and optical character readers, it is possible to effectively utilize the space in the frame without the need for soldering the substrate of the signal processing portion to the upper surface or the bottom surface of the substrate of the light receiving portion, so that the light emitting device and the light receiving device are protected from the deleterious influence of soldering. In addition, since the substrate of the signal processing portion is not attached to the bottom surface of the substrate of the light receiving portion, it is possible to reduce the height of the image sensor by the height corresponding to the substrate of the signal processing portion.

Although the substrate of the signal processing portion may be disposed in any direction in a space provided within the frame, it is preferable to dispose it parallel to the side surface of the frame (perpendicularly to the transparent cover), as will be described in the following embodiments. It is preferable that the width of the substrate of the signal processing portion is as small as possible. For this reason, a hybrid substrate with an electronic part mounted thereon which processes signals supplied from the light emitting device and the light receiving device is optimal.

The above and other objects, features and advantages of the present invention will become clear from the following description of the preferred embodiments thereof, taken in conjunction with the accompanying drawings.

BRIEF DESCRIPTION OF THE DRAWINGS

FIGS. 3(a) and 3(b) are a side elevational view and a bottom view, respectively, of another part of the embodiment shown in FIG. 1;

DESCRIPTION OF THE PREFERRED EMBODIMENT

Figure 1:
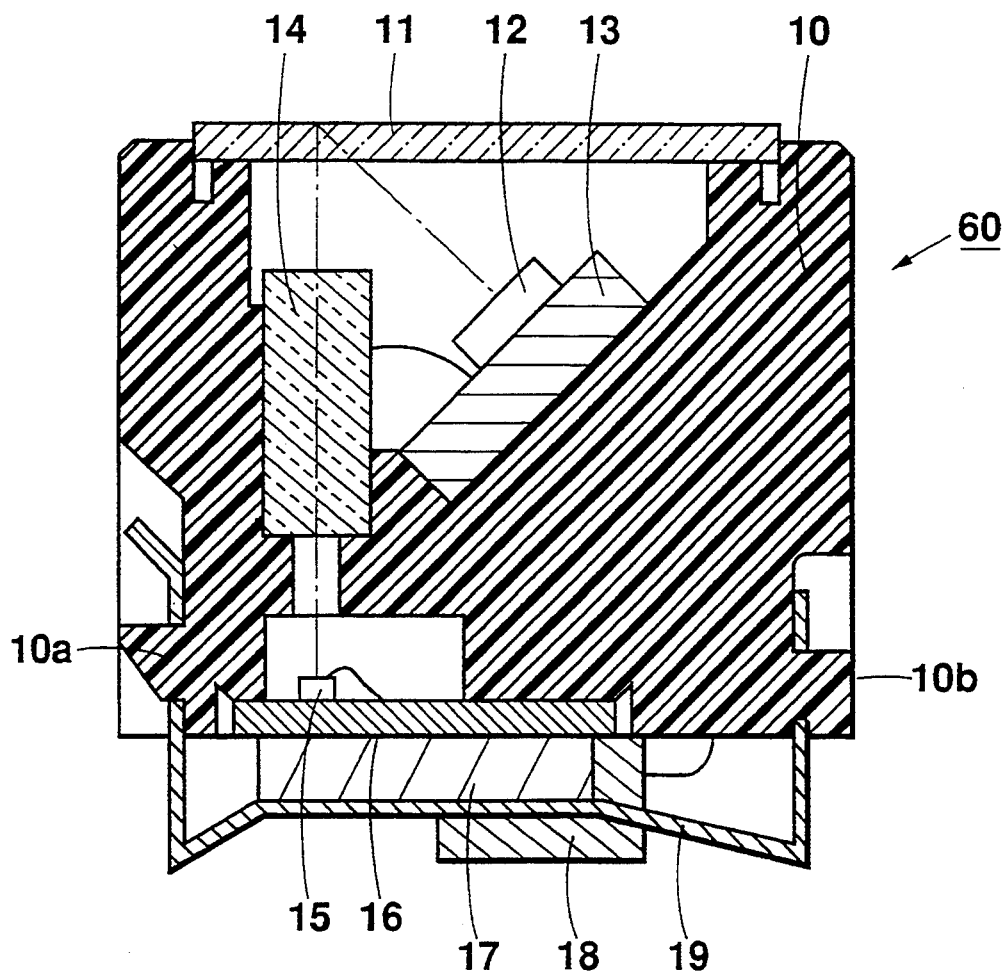
FIG. 1 is a sectional view of an embodiment of an image sensor according to the present invention.

An image sensor according to the present invention will now be explained with reference to a preferred embodiment. In this image sensor 60, a transparent cover (glass cover) 11 is attached to the upper portion of a resin frame 10, and a substrate of a light projecting portion (light emitting portion) 13 having a light emitting device (e.g., LED chip) 12 is fixed to the frame 10 in such a manner as to be inclined toward the surface of the glass cover 11. A rod lens array 14 (optical system) for converging the light reflected from a copy (not shown) as an object being photographed which is brought into contact with the glass cover 11 is fixed to the frame 10 in such a manner as to be perpendicular relative to the surface of the glass cover 11. Directly under the rod lens array 14 is disposed a sensor substrate (substrate of a light receiving portion) 16 having a light receiving device 15 for receiving the light from the rod array lens 14. The glass cover 11, the substrate of the light projecting portion 13 and the rod lens array 14 are fixed to the frame 10 by an adhesive or screws.

Figure 2:
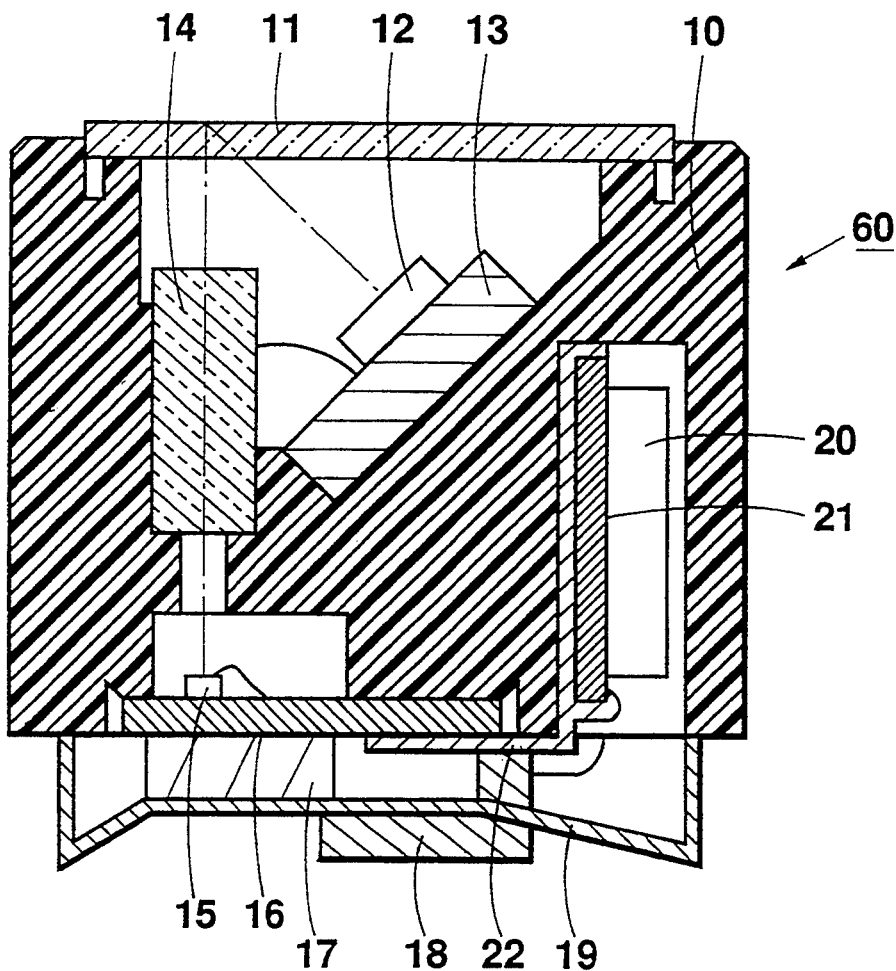
FIG. 2 is a sectional view of another part of the embodiment shown in FIG. 1.

As shown in FIG. 2, a hybrid substrate 21 with an electronic part 20 mounted thereon is disposed in a space provided within the frame 10 along the side surface thereof, for example, in a space at the back of the sensor substrate 16, in parallel with the side surface of the frame 10. The electronic part 20 drives the light emitting device 32 and the light receiving device 35, and processes an image information signal. The hybrid substrate 21 is supported by a lead frame 22 which is attached to the bottom surface of the sensor substrate 16. The lead frame 22 electrically connects the substrates 16 and 21 and is soldered to predetermined soldering patterns which are formed on the bottom surface of the sensor substrate 16 and the hybrid substrate 21. In this embodiment, the hybrid substrate 21 is disposed approximately in the center of the image sensor 60, as is obvious from FIG. 3(a) which shows a side elevation of the image sensor 60 and FIG. 3(b) which shows the bottom thereof. According to this arrangement of the hybrid substrate 21, since the lead frame 22 for connecting the sensor substrate 16 and the hybrid substrate 21 is soldered to the bottom surface of the sensor substrate 16, flux or the like does not scatter onto the light receiving device 15. In addition, since the hybrid substrate 21 is not attached to the bottom surface of the sensor substrate 16, it is possible to reduce the height of the image sensor by the height corresponding to the hybrid substrate 21.

Furthermore, in this embodiment, since the frame 10 is made of a resin, a reinforcing plate 17 for reinforcing the rigidity of the frame 10 and straightening the warp thereof is attached to the bottom surface of the sensor substrate 16. An elastic clasp 19 is engaged with projections 10a, 10b which are provided on the side surfaces of the frame 10, and the sensor substrate 16 with the reinforcing plate 17 attached thereto is held by the elastic clasp 19 so as to be pressed against the lower portion of the frame 10 (FIG. 1). A connector 18 for outputting an image information signal or the like obtained by the light receiving device 15 to an external device is soldered to the bottom surface of the sensor substrate 16.

A trimmer resistor 23 which is adjustable from an external device is provided approximately in the center of one side surface of the image sensor 160. By tightening or loosening the two screws of the trimmer resistor 23 of the image sensor 160 in the mounted state, it is possible to change the current applied to the hybrid substrate 21 so as to control the driving operation and the image information signal processing operation of the electronic part 20.

In the present invention, only the essential parts are mounted on the sensor substrate 16 for fixing the light receiving device 15 so that the sensor substrate 16 can also be mounted in an image sensor of another type. On the other hand, parts for providing the function which is characteristic of the image sensor 160 in which the hybrid substrate 21 is mounted are mainly disposed on the hybrid substrate 21. It is therefore possible to use the sensor substrate 16 as the base assembly of an image sensor, which enhances the economical advantage at the time of manufacturing image sensors.

In FIG. 3, the reinforcing plate 17 is not attached to the entire length of the substrate 16. In order to secure the space for accommodating a pattern portion 16a and the connector 18 which constitute the connecting portion of the sensor substrate 16 and the hybrid substrate 21 with the electronic part 20 mounted thereon, the corresponding portion is cut away from the reinforcing plate 17.

An optical character reader according to the present invention incorporates an image sensor of the present invention.

Figure 4:
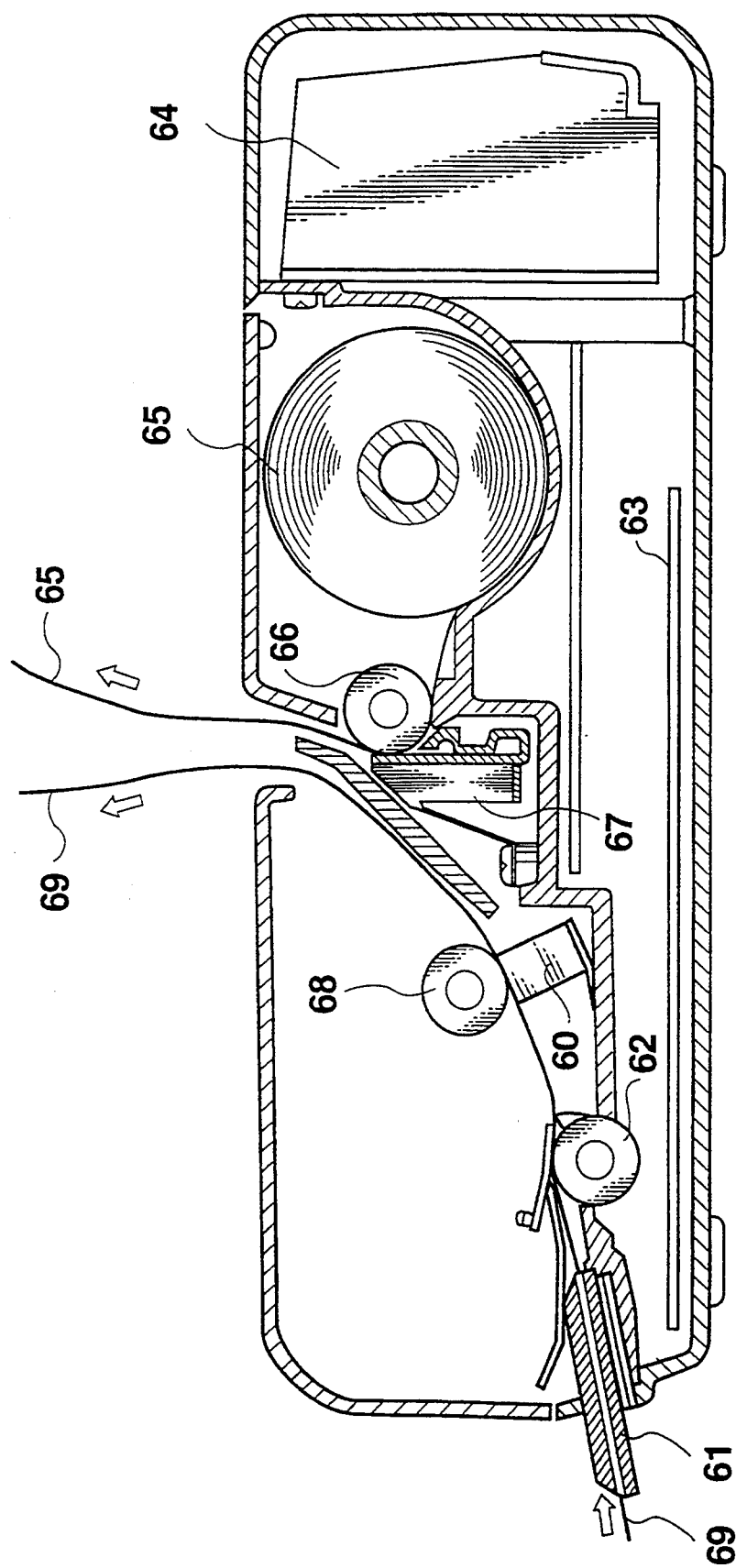
FIG. 4 is a sectional view of an embodiment of an optical character reader according to the present invention.
Figure 5:
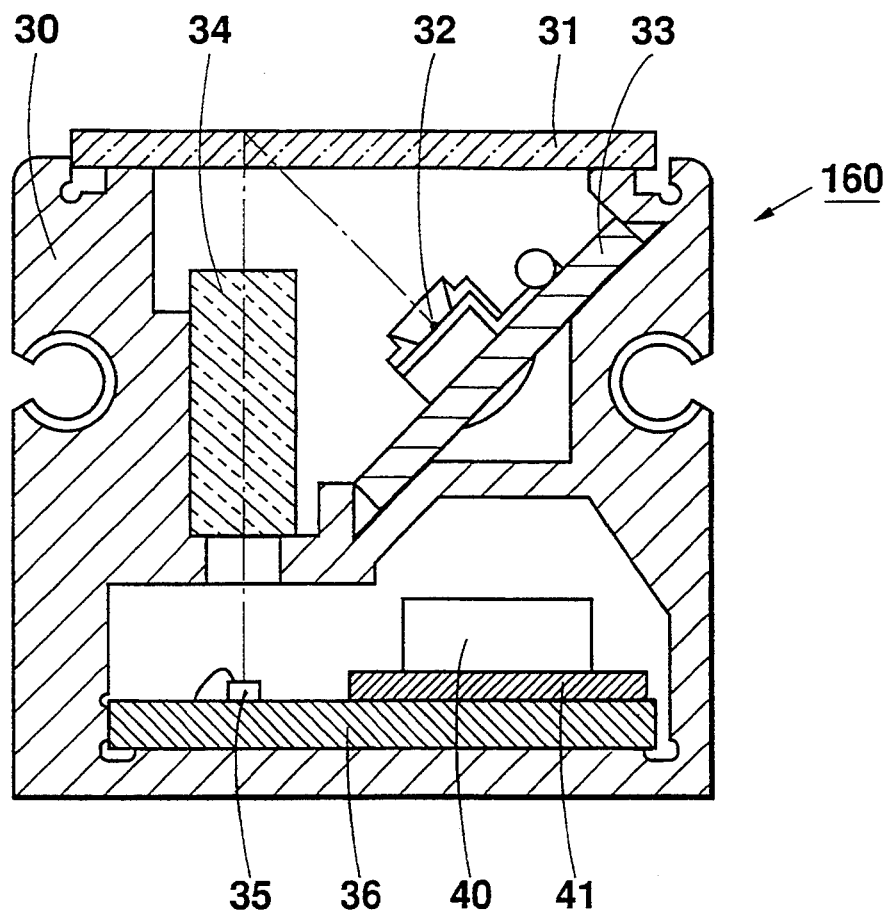
FIG. 5 is a sectional view of an image sensor in the related art.
Figure 6:
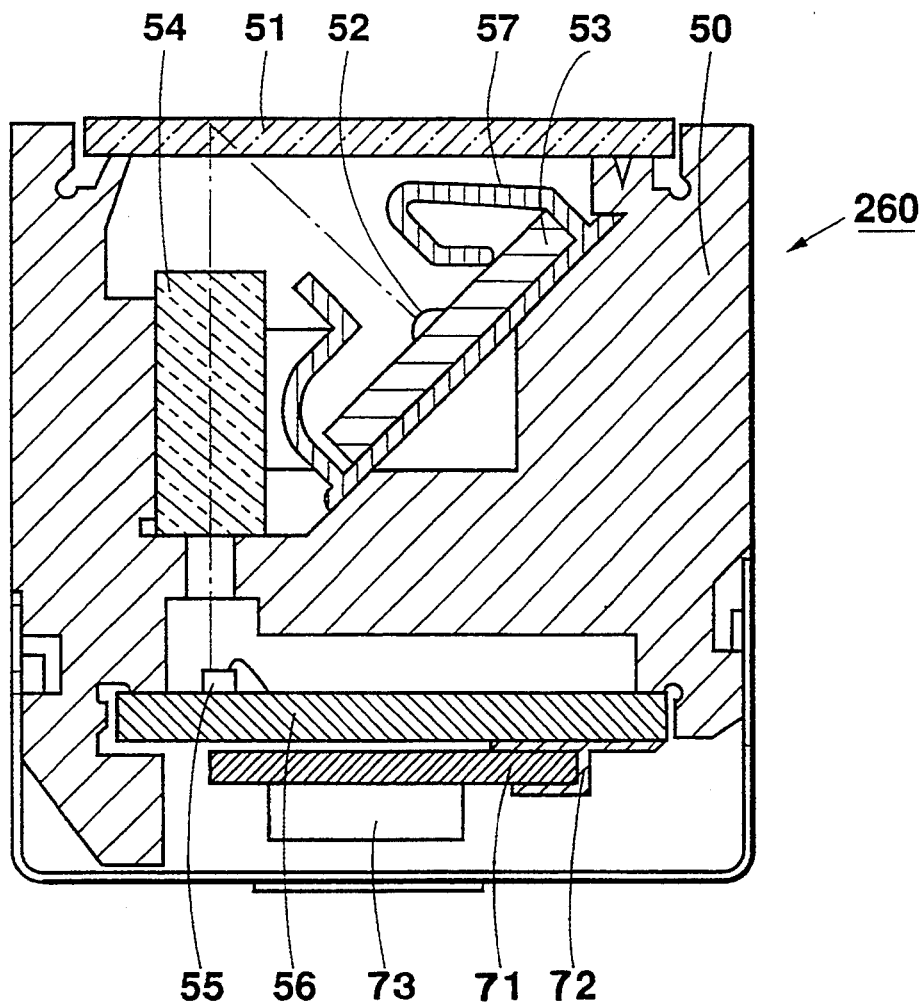
FIG. 6 is a sectional view of another image sensor in the related art.
Figure 7:
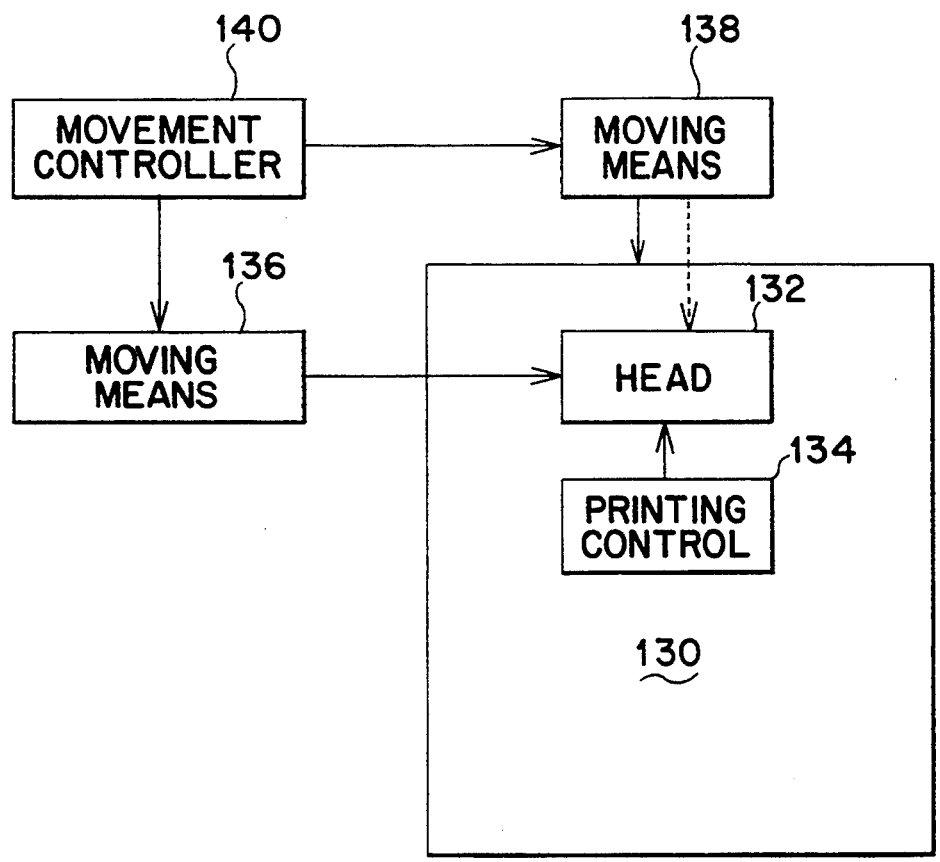

FIG. 4 shows the inner structure of an embodiment of an optical character reader according to the present invention. The optical character reader is composed of a copy supplying portion, a recording paper supplying portion, a thermal transfer printing portion, a system control substrate 63 and a power source 64.

The copy supplying portion is composed of a feed-in tray 61 for stocking a stack of copies 69, a feed roller 62 for drawing and carrying the copy at the top of the stack from the feed-in tray 61 in the processing direction, and the image sensor 60 described above. The recording paper supplying portion is composed of recording paper 65 to which the copy is transferred and a platen roller 66 for feeding the recording paper 65.

The optical character reader of the present invention reads the characters of the copy 69 as image information signals by the image sensor 60 of the present invention, and transfers the image information to the recording paper 65 by a thermal transfer printing portion such as a thermal head 67.

As explained above, an image sensor and an optical character reader of the present invention which are characterized in that a space for accommodating the substrate of the signal processing portion is provided within the frame of the image sensor has the following advantages.

(1) Since the substrate of the signal processing portion is not attached to the bottom surface of the substrate of the light receiving portion, it is possible to reduce the height of the image sensor by the height corresponding to the substrate of the signal processing portion, which leads to the realization of a small-sized image sensor.

(2) The substrate of the signal processing portion provided in a space is connected to the substrate of the light receiving portion on the bottom surface of the substrate of the light receiving portion by a lead frame as described in the first embodiment, so flux or the like does not scatter onto the light receiving device during soldering, so that the deleterious influence of soldering is not exerted, especially, on the light receiving device, thereby preventing the deterioration of the picture quality.

(3) Since the trimmer resistor is mounted on the outer side surface of the image sensor, it is possible to adjust the image sensor in the mounted state from an external device.

(4) Only the essential parts are mounted on the sensor substrate for fixing the light receiving device. On the other hand, parts for providing the function which is characteristic of the image sensor in which the hybrid substrate is mounted are mainly disposed on the hybrid substrate. It is therefore possible to use the sensor substrate as the base assembly of an image sensor, which enhances the economical advantage at the time of manufacturing image sensors.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. An image sensor for use with an object, said sensor comprising:
   (a) a transparent cover with which said object is brought into contact;
   (b) a light emitting portion disposed to be inclined toward said transparent cover for projecting light onto said object;
   (c) an optical system disposed perpendicularly relative to said transparent cover for converging light reflected from said object;
   (d) a light receiving portion provided under said optical system to receive light from said optical system, said light receiving portion including a substrate oriented in a plane perpendicular to the received light;
   (e) a signal processing substrate for carrying an electronic part for processing an image information signal, the signal processing substrate being oriented in a plane perpendicular to the plane of the light receiving portion substrate; and
   (f) a frame having
       an opening portion provided at an upper end thereof to receive said transparent cover,
       a first space provided under said opening portion to accommodate said light emitting portion, said optical system, and said light receiving portion, and
       a second space provided separately from said first space to accommodate said signal processing substrate.

2. An image sensor according to claim 1, wherein said second space of said frame is formed at the back of an inner wall of said first space on which said light emitting portion is disposed.

3. An image sensor according to claim 1,
   wherein said second space of said frame is formed along a side surface of said frame at the back of an inner wall of said first space on which said light emitting portion is disposed; and
   said signal processing substrate is disposed on the inner wall of said second space in parallel with the side surface of said frame, the side surface being perpendicular to the transparent cover.

4. An image sensor according to claim 1, wherein said light receiving portion substrate is electrically connected to said signal processing substrate by a lead frame, said lead frame being soldered to predetermined soldering patterns provided on a bottom surface of said light receiving substrate and on said signal processing substrate.

5. An image sensor according to claim 1, wherein said signal processing substrate is a hybrid substrate.

6. An optical character reader comprising:
(a) a feed-in tray for stocking a stack of objects being photographed;
(b) a feed roller for drawing and carrying the object being photographed at the top of said stack from said feed-in tray in the processing direction;
(c) an image sensor for reading the characters of said object carried by said feed roller as image information signals;
said image sensor including:
(i) a transparent cover with which an object being photographed is brought into contact;
(ii) a light emitting portion disposed to be inclined toward said transparent cover for projecting light onto said object;
(iii) an optical system disposed perpendicularly relative to said transparent cover for converging light reflected from said object;
(iv) a light receiving portion provided under said optical system to receive light reflected from said optical system, said light receiving portion including a substrate oriented in a plane perpendicular to the
(v) a signal processing substrate for carrying an electronic part for processing an-image information signal, the signal processing substrate being oriented in a plane perpendicular to the plane of the light receiving portion substrate; and
(vi) a frame having an opening portion provided at an upper end thereof to receive said transparent cover, a first space provided under said opening portion to accommodate said light emitting portion, said optical system, and said light receiving portion, and a second space provided separately from said first space to accommodate said substrate of said signal processing substrate;
(d) recording paper for transferring said object thereonto;
(e) a recording paper supplying portion including a platen roller for feeding said recording paper; and
(f) a thermal transfer printing portion for printing said characters read by said image sensor on said recording paper.

7. An image sensor incorporated into an optical character reader according to claim 6, wherein said second space of said frame is formed at the back of an inner wall of said first space on which said light emitting portion is disposed.

8. An image sensor incorporated into an optical character reader according to claim 6,
wherein said second space of said frame is formed along a side surface of said frame at the back of an inner wall of said first space on which said light emitting portion is disposed; and
said signal processing substrate is disposed on the inner wall of said second space in parallel with the side surface of said frame, said side surface being perpendicular to the transparent cover.

9. An image sensor incorporated into an optical character reader according to claim 6,
wherein said light receiving portion substrate is electrically connected to said signal processing substrate by a lead frame,
said lead frame being soldered to predetermined soldering patterns provided on a bottom surface of said light receiving substrate and on said signal processing substrate.

10. An image sensor incorporated into an optical character reader according to claim 6, wherein said signal processing substrate is a hybrid substrate.

11. An image sensor An image sensor for use with an object, the sensor comprising:
a light emitting portion for projecting light onto the object;
an optical system for converging light reflected from the object;
a light receiving portion for receiving light from the optical system and for providing an electrical signal based, at least in part, on the received light, the light receiving portion including a light receiving substrate oriented in a plane perpendicular to the received light;
a signal processing substrate supporting signal processing circuitry, the signal processing substrate being oriented so portion including a light receiving substrate oriented in a plane perpendicular to the received light;
a signal processing substrate supporting a signal processing circuitry, the signal processing substrate being oriented so that no line perpendicular to the plane of the light receiving substrate passes through both the signal processing substrate and the light receiving substrate; and
means for electrically connecting the signal processing substrate and the light receiving portion;
wherein the sensor has a frame with a bottom surface and side surfaces which are substantially perpendicular to the bottom surface, and wherein the light receiving substrate is oriented substantially parallel to the bottom surface, and the signal processing substrate is oriented substantially parallel to one of the side surfaces.

12. The sensor of claim 11 further comprising means for manually adjusting an electrical signal between the signal processing substrate and the light receiving portion.

13. The sensor of claim 12 wherein the adjusting means is accessible at the side surface.

14. An image sensor for use with an object, the sensor comprising:
a generally rectangular three-dimensional frame having a top surface onto which the object is placed, a bottom surface parallel to the top surface, and side surfaces;
a light emitting portion for projecting light onto the object;
means for receiving light reflected from the object and including
a light receiver, and
a light receiving substrate having a top surface in contact with the light receiver, and a bottom surface which is near the bottom surface of the frame;
a signal processing portion having a signal processing substrate, wherein a portion of the frame is intermediate the signal processing substrate and the light receiving substrate; and an electrical contact electrically connecting the signal processing substrate and the light receiving substrate.

15. The sensor of claim 14 further comprising a support member which abuts the bottom surface of the light receiving portion.

16. The sensor of claim 14 wherein the signal processing substrate is oriented in parallel to and near a side surface of the frame.

17. The sensor of claim 14 further comprising means for adjusting an electrical signal applied to the signal processing substrate from the light receiving portion.

18. The sensor of claim 17 wherein the adjusting means is accessible for adjustment at the side surface parallel to and near the signal processing substrate.

19. The sensor of claim 18 wherein the adjusting means is a manually adjustable trimmer resistor.

* * * * *